(12) United States Patent
Li

(10) Patent No.: US 10,659,158 B1
(45) Date of Patent: May 19, 2020

(54) SIGNAL TRANSMITTING AND RECEIVING DEVICES, METHOD AND SYSTEM BASED ON VISIBLE LIGHT COMMUNICATION

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Yingyi Li, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/396,038

(22) Filed: Apr. 26, 2019

(30) Foreign Application Priority Data

Nov. 8, 2018 (CN) .......................... 2018 1 1327409

(51) Int. Cl.
| | |
|---|---|
| *H04B 10/116* | (2013.01) |
| *H04B 10/60* | (2013.01) |
| *H04B 10/50* | (2013.01) |
| *H04B 10/112* | (2013.01) |
| *H04B 10/11* | (2013.01) |

(Continued)

(52) U.S. Cl.
CPC ........... *H04B 10/116* (2013.01); *H04B 10/50* (2013.01); *H04B 10/60* (2013.01); *H04B 10/11* (2013.01); *H04B 10/112* (2013.01); *H04B 10/114* (2013.01); *H04B 10/40* (2013.01)

(58) Field of Classification Search
None
See application file for complete search history.

(56) References Cited

U.S. PATENT DOCUMENTS 4,893,353 A * 1/1990 Iwaoka ................. G02F 1/11
  398/183
5,953,146 A * 9/1999 Shelby ................. H04B 10/11
  398/131

(Continued)

FOREIGN PATENT DOCUMENTS

| CN | 102224691 A | 10/2011 |
|---|---|---|
| CN | 102577180 A | 7/2012 |
| CN | 102868448 A | 1/2013 |

OTHER PUBLICATIONS

First Office Aciton for CN Appl. No. 201811327409.9, dated Mar. 3, 2020.

*Primary Examiner* — Darren E Wolf
(74) *Attorney, Agent, or Firm* — Foley & Lardner LLP

(57) ABSTRACT

The present application discloses a signal transmitting device based on visible light communication, which includes a first control unit and a visible light emitting unit array, wherein the first control unit is configured to acquire target data and generate a light emission control instruction based on the target data according to a set encoding rule, and the light emission control instruction includes an instruction for controlling the light-dark state of each light emitting unit in the visible light emitting unit array, and the visible light emitting unit array is configured to transmit the target data in form of a visible light signal according to the light emission control instruction. The present application further discloses a signal receiving device based on visible light communication, a visible light communication system and a visible light communication method.

14 Claims, 6 Drawing Sheets

(51) Int. Cl.
*H04B 10/40* (2013.01)
*H04B 10/114* (2013.01)

(56) References Cited

U.S. PATENT DOCUMENTS

| | | | | |
|---|---|---|---|---|
| 6,064,502 A | * | 5/2000 | Burns | H04B 10/114 |
| | | | | 398/117 |
| 6,091,495 A | * | 7/2000 | Ogawa | H04B 10/50 |
| | | | | 356/450 |
| 6,154,297 A | * | 11/2000 | Javitt | H04B 10/11 |
| | | | | 398/1 |
| 6,204,898 B1 | * | 3/2001 | Maeda | G02B 6/0036 |
| | | | | 349/58 |
| 2001/0040713 A1 | * | 11/2001 | Haruyama | H04B 10/1143 |
| | | | | 398/140 |
| 2003/0160918 A1 | * | 8/2003 | Rho | G02F 1/133555 |
| | | | | 349/113 |
| 2011/0200338 A1 | | 8/2011 | Yokoi | |
| 2014/0093234 A1 | * | 4/2014 | Roberts | H04J 14/00 |
| | | | | 398/25 |
| 2017/0338864 A1 | * | 11/2017 | Rolsted | H04B 5/0081 |

* cited by examiner

SIGNAL TRANSMITTING AND RECEIVING DEVICES, METHOD AND SYSTEM BASED ON VISIBLE LIGHT COMMUNICATION

CROSS-REFERENCE TO RELATED APPLICATIONS

The present application claims priority to CN Application No. 201811327409.9 filed on Nov. 8, 2018, the disclosed content of which is hereby incorporated in the present application by reference as a whole.

TECHNICAL FIELD

The present application relates to the technical field of optical communication, and in particular, to signal transmitting and receiving devices, method and system based on visible light communication.

BACKGROUND

The visible light communication technology refers to a way of communication for directly transmitting optical signals in the air by using light of a visible light band as an information carrier without needing a transmission medium of a wired channel such as optical fiber, etc. With the development of visible light communication technology, the transmitting end of signal is multiplexed with the illumination source, so the visible light communication has the characteristics of being energy saving, low carbon green, environmentally friendly and so on. Currently, visible light communication technology is still being used and promoted under water and some low electromagnetic interference assemblies.

Visible light communication usually uses a light-emitting diode (LED) as a data transmitting end and a photodiode as a data receiving end.

SUMMARY

A first aspect of the embodiments of the present application provides a signal transmitting device based on visible light communication, including a first control unit and a visible light emitting unit array. The first control unit is configured to acquire target data, and generate a light emission control instruction based on the target data according to a set encoding rule, wherein the light emission control instruction includes an instruction to control light-dark state of each light emission unit in the visible light emission unit array. The visible light emission unit array is configured to transmit the target data in form of a visible light signal according to the light emission control instruction.

Optionally, the first control unit is further configured to determine the way of arrangement of the visible light emission unit array; divide the target data into target data segments matching the way of arrangement according to said way of arrangement; and form corresponding light emission control instructions according to the target data segments and sequentially transmit the light control instructions to the visible light emitting unit array.

A second aspect of the embodiments of the present application provides a signal receiving device based on visible light communication, including a visible light receiving unit and a second control unit. The visible light receiving unit is configured to acquire a visible light signal to obtain image data of at least one image having an array of light and dark dots. The second control unit is configured to parse the image data according to a set decoding rule and restore target data.

Optionally, the second control unit is further configured to acquire image data of at least two images having an array of light and dark dots at preset time interval, compare image data of the at least two images, and remove image data of an image in which the difference of the array of the light and dark dots is greater than a difference threshold.

Optionally, the second control unit is further configured to: parse the image data to restore target data segments; and integrate the target data segment into the target data.

Optionally, the visible light receiving unit is a charge coupled image sensor or a complementary metal oxide semiconductor image sensor.

Optionally, the signal receiving device based on visible light communication further includes a lens unit, which is disposed on a light incident side of the visible light receiving unit.

A third aspect of the embodiments of the present application provides a visible light communication system, which includes a signal transmitting device and a signal receiving device. The signal transmitting device includes a first control unit and a visible light emitting unit array, wherein the first control unit is configured to acquire target data and generate a light emission control instruction based on the target data according to a set encoding rule, the light emission control instruction includes an instruction for controlling the light-dark state of each light emitting unit in the visible light emitting unit array, and the visible light emitting unit array is configured to transmit the target data in form of a visible light signal according to the light emission control instruction. The signal receiving device includes a visible light receiving unit and a second control unit, wherein the visible light receiving unit is configured to acquire a visible light signal and obtain image data of at least one image having an array of light and dark dots, and the second control unit is configured to parse the image data according to a set decoding rule and restore the target data.

Optionally, the visible light communication system further includes spectroscopic device, which is disposed on an optical path of the signal transmitting device for transmitting a visible light signal, and the spectroscopic device is configured to divide the visible light signal into at least two paths to be received by at least two signal receiving devices, respectively.

A fourth aspect of the embodiment of the present application provides a method for implementing visible light communication, comprising:

obtain target data;

generate a light emission control instruction from the target data according to a set encoding rule, wherein the light emission control instruction includes an instruction to control light-dark state of each light emission unit in a visible light emission unit array; and transmit the target data in form of a visible light signal using the visible light emitting unit array according to the light emission control instruction.

Optionally, the method for implementing visible light communication further comprises:

determining a way of arrangement of the visible light emitting unit array;

dividing the target data into target data segments matching the way of arrangement according to said way of arrangement; and forming the corresponding light emission control instructions according to the target data segments and sequentially transmitting the light emission control instructions to the visible light emission unit array.

A fifth aspect of the embodiments of present application provides a method for implementing visible light communication, comprising:

acquiring a visible light signal to obtain image data having an array of light and dark dots;

parsing the image data according to a set decoding rule to restore the target data.

Optionally, the method for implementing visible light communication further comprises:

comparing the image data acquired at the preset time interval;

removing image data in which the difference of the array of the light and dark dots is greater than a difference threshold.

Optionally, the method for implementing visible light communication further comprises:

parsing the image data to restore the target data segments;

integrating the target data segments into the target data.

A sixth aspect of the embodiments of the present application provides a method for visible light communication, comprising: by a signal transmitting device, acquiring target data, generating a light emission control instruction according to a set coding rule, and transmitting the target data in form of a visible light signal by using a visible light emitting unit array according to the light emission control instruction, wherein the light emission control instruction includes an instruction for controlling light-dark state of each light emission unit in the visible light emitting unit array; and acquiring a visible light signal by a signal receiving device to obtain image data having an array of light and dark points, and parsing the image data according to the set decoding rule to restore target data.

Optionally, the method for visible light communication also comprises, by a signal transmitting device, determining a way of arrangement of the visible light emitting unit array, segmenting the target data into target data segments matching the way of arrangement according to said way of arrangement, and forming the corresponding light emission control instructions according to the target data segments and sequentially transmitting the light emission control instructions to the visible light emitting unit array.

Optionally, the method for visible light communication further comprises acquiring image data of at least two images having an array of light and dark dots at preset time interval, comparing image data of the at least two images, and removing image data of an image in which the difference of the array of the light and dark dots is greater than a difference threshold.

Optionally, the method for visible light communication further comprises, by a signal receiving device, parsing the image data to restore the target data segments, and integrating the target data segments into the target data.

Optionally, the method for visible light communication further comprises: dividing, by a spectroscopic device, the visible light signal into at least two paths, and receiving the at least two paths of visible signals by at least two signal receiving devices, respectively.

BRIEF DESCRIPTION OF THE DRAWINGS

In order to explain the technical solutions of the embodiments of the present application more clearly, a brief introduction will be given below for the drawings of the embodiments. Apparently, the drawings illustrated as follows relate only to some of the embodiments of the present application, and are not intended to limit the present application.

FIG. 6b is a schematic diagram of optical paths of the visible light communication system shown in FIG. 6a;

DETAILED DESCRIPTION

Figure 1:
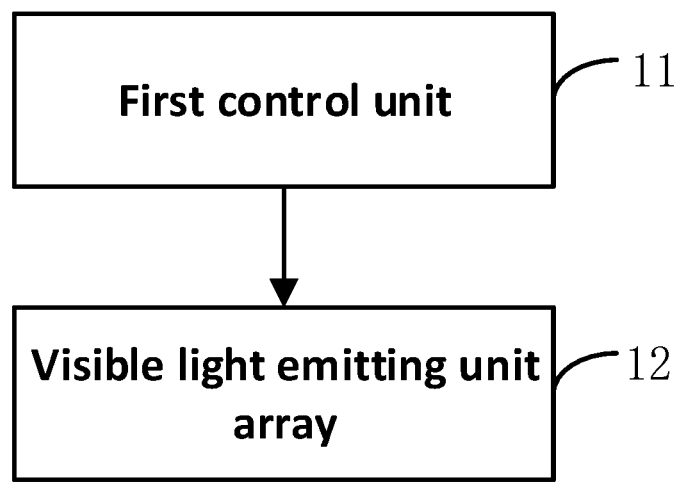
FIG. 1 is a structural block diagram of an embodiment of a signal transmitting device based on visible light communication provided by the present application.

In order to make the purposes, technical solutions and advantageous of the embodiments of the present application clearer, the technical solutions of the embodiments of the present application will be described clearly and completely with reference to the accompanying drawings of the embodiments of the present application. Obviously, the described embodiments are just a part, instead of all, of the embodiments of the present application. All other embodiments obtained by persons of ordinary skill in the art based on the described embodiments of the present invention without paying creative efforts shall fall within the scope of protection of the present application.

Unless otherwise defined, the technical or scientific terms used in the present disclosure shall be understood in common meaning by those of ordinary skill in the art to which this application belongs. The terms "first", "second" and similar words used in the present disclosure do not denote any order, quantity, or importance, but merely serve to distinguish different parts. Likewise, similar words like "a", "an" and "the" do not indicate a limitation of quantity, but only mean that there is at least one something. The word "comprising" or "comprises" or the like means that the element or item preceding the word covers the element or item or its equivalent enumerated after that word, but does not exclude the possibility of also covering other elements or items. The word "connection" or "connect" and the like are not limited to physical or mechanical connection, but may include electrical connections, whether direct or indirect. "Up", "Down", "Left", "Right", and the like are used only to indicate a relative positional relationship, and when the absolute position of the described object is changed, the relative positional relationship may also change correspondingly.

The embodiments of the present application are intended to propose a signal transceiver device, method and system based on visible light communication.

The signal transmitting and receiving devices, method and system based on visible light communication provided by the embodiments of the present application convert target data into a light emission control instruction according to a set encoding rule at a signal transmitting end, such that the visible light emitting unit array may transmit the target data in form of a visible light signal according to the light emission control instruction thereby to complete signal transmission based on light communication; at the signal receiving end, by collecting visible light signals, image data having an array of light and dark dots is obtained, and then the image data is parsed and restored to the target data, thereby completing signal receiving based on visible light communication; since the target data is transmitted through the visible light emitting unit array, according to the number of the light emitting units in the array, the corresponding number of visible light signals can be transmitted at the same point in time, and moreover, the target data is parsed from the collected image data, and the visible light signals of more than one light emitting unit can be parsed from one frame of image data, so that the corresponding number of visible light signals can be received at the same point in time, and thus the transmission efficiency of the visible light communication method is greatly improved compared with the optical signal transmission of the single LED in the related art.

A first aspect of the embodiments of the present application provides a signal transmitting apparatus based on visible light communication.

As shown in FIG. 1, the signal transmitting device based on visible light communication includes a first control unit 11 and a visible light emitting unit array 12:

the first control unit 11 is configured to acquire target data, and generate a light emission control instruction based on the target data according to a set coding rule, where the light emitting control instruction includes an instruction for controlling light-dark state of each lighting unit in the visible light emitting unit array;

the visible light emitting unit array 12 is configured to transmit the target data in form of a visible light signal according to the light emission control instruction.

According to the above embodiment, it can be seen that the signal transmitting device based on visible light communication provided by the present application converts target data into a light emission control instruction according to a set encoding rule, such that the visible light emitting unit array may transmit the target data in form of a visible light signal according to the light emission control instruction thereby to complete signal transmission based on visible light communication; since the target data is transmitted through the visible light emitting unit array, according to the number of the light emitting units in the array, the corresponding number of visible light signals can be transmitted at the same point in time, so that the transmission efficiency of the visible light communication method is greatly improved compared with the optical signal transmission of the single LED in the related art.

Figure 2:
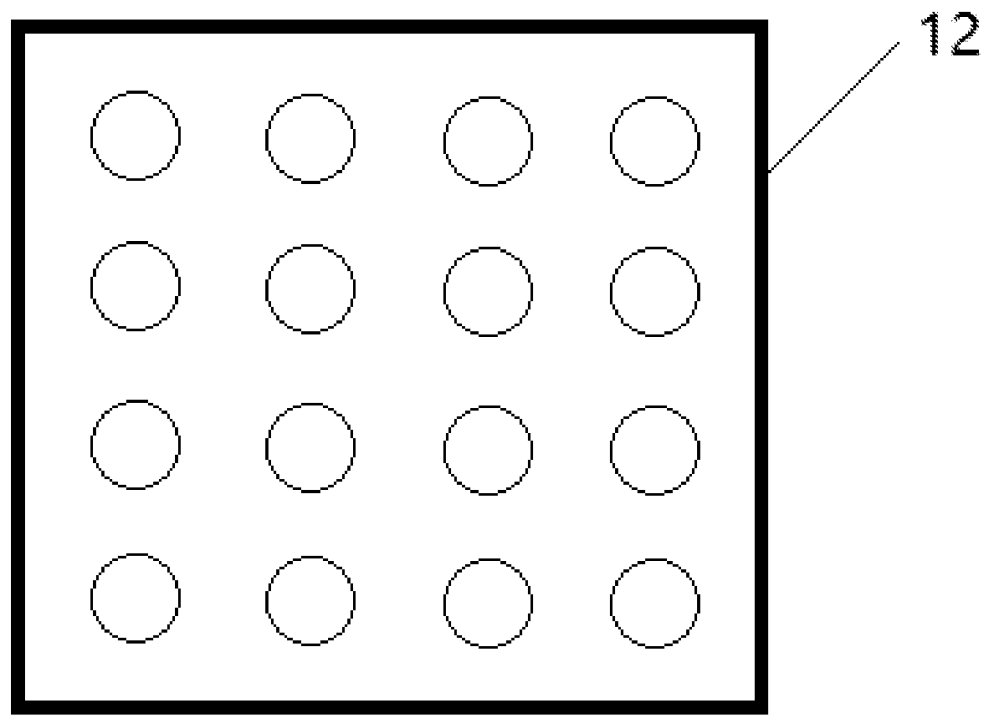
FIG. 2 is a schematic diagram of a visible light emitting unit provided by an embodiment of the present application.

FIG. 2 illustrates an embodiment of the visible light emitting unit array 12. The visible light emitting unit array 12 is composed of 4×4 light emitting units. Taking the target data [1001 0011 1100 0011] as an example, assuming that the coding rule is that the light-emitting units in the visible light emitting unit array 12 correspond to the target data from left to right and from top to bottom, respectively, and correspondingly, the light emission control instruction is to control the first row of the light-emitting units to be "light dark dark light" (i.e., light corresponds to 1, and dark corresponds to 0), control the second row of light emitting units to be "dark dark light light", and control the third row of light emitting units to be "light light dark dark", control the fourth row of light emitting units to be "dark dark light light". In this way, the target data is sent out within a single frame time, without needing to use a light emitting unit to sequentially transmit the visible light signals of "light dark dark light; dark dark light light; light light dark dark; dark dark light light", thereby greatly improving the transmission efficiency of the visible light communication method.

It should be noted that, in the premise of ensuring the quality and efficiency of optical communication, the array arrangement manner of the visible light emitting unit array 12 and the number of light emitting units that can be included can be selected according to actual conditions, for example, 5×4, 5×5, 6×6, etc., without being limited only to the examples given in the present application. Meanwhile, the foregoing coding rule of corresponding to the target data from left to right and from top to bottom is not unique. It is conceivable that coding rule of corresponding to the target data from top to bottom and then from left to right, or from right to left and from top to bottom, etc. may also be used, as long as the coding and decoding are performed according to a certain rule. The specific coding rule does not have to be limited.

In the case where the target data is large, the data transmission cannot be completed by the visible light emitting unit array 12 within one frame time, and thus the target data needs to be divided. As an embodiment of the present application, the first control unit 11 is specifically configured to:

determine an arrangement manner of the visible light emitting unit array; the arrangement manner is, for example, 4×4, 5×4, 5×5, 6×8, and the like;

divide the target data into target data segments matching the way of arrangement according to said way of arrangement;

form the corresponding light emission control instruction according to the target data segments and sequentially transmitting the light emission control instructions to the visible light emitting unit array.

By taking the target data being [1001 0011 1100 0011 1100 0001 1101 1101] and the way of arrangement of the visible light emitting unit array being 4×4 as an example, the target data needs to be divided into two target data segments, wherein the target data segment 1 is [0011 1100 0011], and the target data segment 2 is [1100 0001 1101 1101]. Generating corresponding lighting control commands according to the data to be transmitted in the target data segment, and controlling the visible light emitting unit array 12 to transmit the visible light signal of "light, dark dark light, dark dark light light, light light dark dark, dark dark light light" during the time period of the first frame. During the time period of the second frame, the visible light emitting unit array 12 is controlled to transmit a visible light signal of "light light dark dark, dark dark dark light, light light dark light, light light dark light", thereby completing the transmission of the target data.

In this way, it is possible to continuously transmit target data with a large amount of data, thereby realizing more complicated visible light communication.

It should be noted that, in the foregoing embodiment, that the target data is a binary string is taken as an example for illustration. It can be known that when the target data is a decimal or hexadecimal string, it can be converted into a binary string and then transmitted by the visible light emitting unit array 12. The working principle is basically the same, and details are not described herein again.

Figure 3:
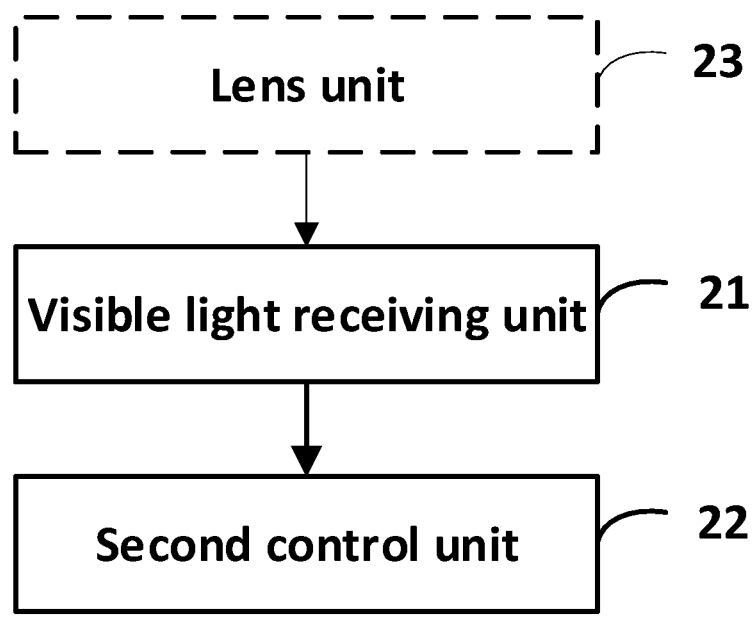
FIG. 3 is a structural block diagram of an embodiment of a signal transmitting device based on visible light communication provided by an embodiment of the present application.

A second aspect of the embodiments of the present application provides a signal receiving device based on visible light communication. As shown in FIG. 3, the signal receiving device based on visible light communication includes a light receiving unit 21 and a second control unit 22; the visible light receiving unit 21 is configured to collect visible light signals to obtain image data having an array of light and dark dots (please refer to FIG. 4a or 4b).

The second control unit 22 is configured to parse the image data according to a set decoding rule and restore the target data.

According to the above embodiment, it can be seen that the signal receiving device based on visible light communication provided in the present application acquires a visible light signal to obtain image data having light and dark dots, and then parses the image data and restore the target, thereby completing signal receiving based on visible light communication; since the target data is parsed by the acquiring image data, and the visible light signals of more than one light-emitting unit can be parsed from one frame of image data, so that the corresponding number of visible light signals can be received at the same point in time, and thus the transmission efficiency of the visible light communication method is greatly improved compared with the optical signal transmission of the single LED in the related art.

Specifically, the step of parsing the image data and restoring to the target data may be performed by analyzing and restoring the image data having the array of light and dark dots according to a predetermined decoding rule; the decoding rule corresponds to the coding rule in the embodiment of the signal transmitting device based on visible light communication as mentioned above.

Figure 4A:
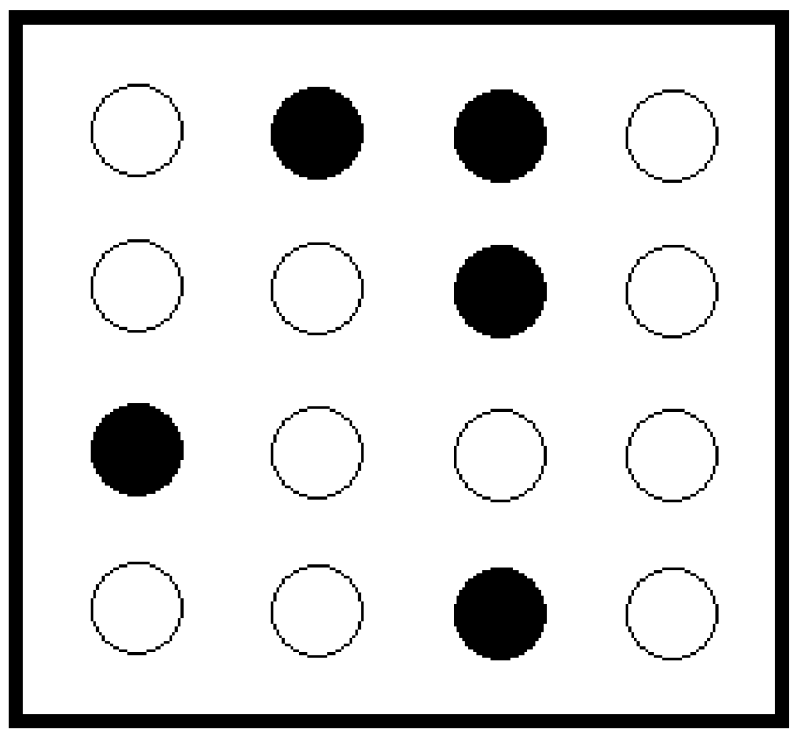
FIG. 4a is a schematic diagram of a type of image data provided by an embodiment of the present application.

Taking the image data collected in FIG. 4a as an example, the image data is an array of 4×4 light and dark dots. Suppose the decoding rule is that the light and dark points in the array of light and dark points correspond to the target data from left to right and from top to bottom, and the character corresponding to the light points is "1", and the character corresponding to the dark points is "0", then the image data shown in FIG. 4a is correspondingly parsed and restored as follows: "light dark dark light" in the first row corresponds to [1001], "light light dark light" in the second row corresponds to [1101], "dark light light light" in the third row corresponds to [0111], and "light light dark light" in the fourth row corresponds to [1101]. The finally obtained target data is [1001 1101 0111 1101]. In this way, the target data containing 16 characters is received within one frame time, and it is not necessary to sequentially receive the visible light signals of "light dark dark light, dark dark light light, light light dark dark, dark dark light light", thereby greatly improving the efficiency of transmission of the visible light communication method.

It should be noted that the decoding rule of corresponding to the target data from left to right and from top to bottom are not unique, and needs to be determined according to the coding rule of the transmitting end. It is conceivable that the signal transmitting device can also adopt a coding rule of corresponding to the target data from top to bottom and then from left to right, or from right to left and from top to bottom, etc., as long as it can conform to a certain rules, and it is unnecessary to limit the specific coding rule. Therefore, correspondingly, in the case where the coding rule is changed, the decoding rule naturally needs to be changed accordingly, and details are not described herein again.

For the case where the target data is large, the signal transmitting device may sequentially transmit the target data at different time periods of frames after segmenting the target data, so the received target data segments need to be integrated so as to obtain the final target data. As an embodiment of the present application, the second control unit 22 is configured to:

parse the image data to restore the target data segments; integrate the target data segments into the target data.

Figure 4B:
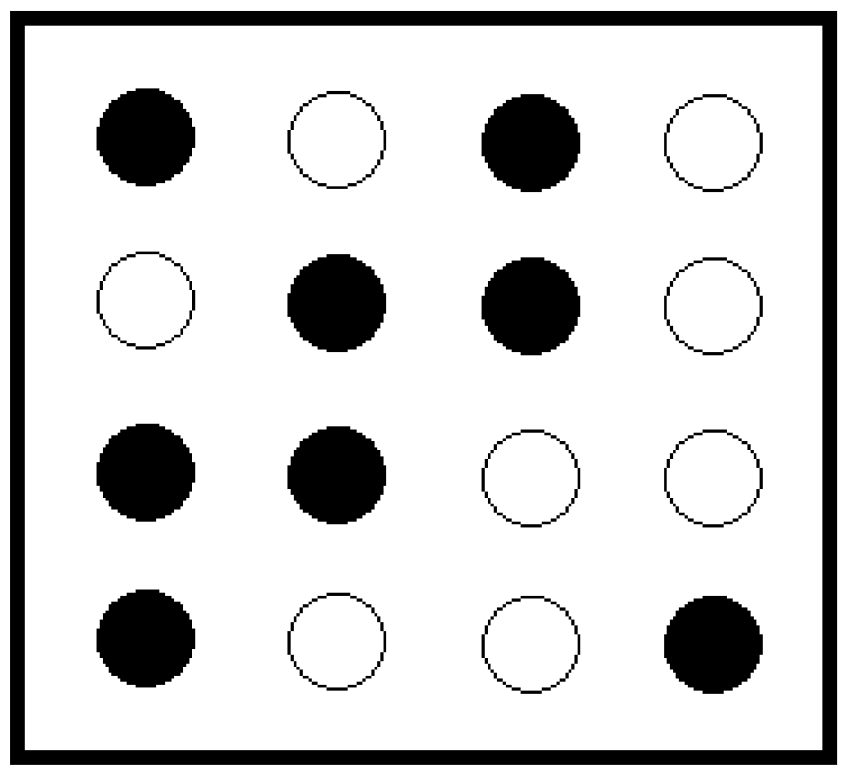
FIG. 4b is a schematic diagram of another type of image data provided by an embodiment of the present application.

FIGS. 4a and 4b show image data corresponding to two target data segments. For the two image data, the target data segments [1001 1101 0111 1101] and [0101 1001 0011 0110] are obtained sequentially by parsing, and the target data after integrating the two is [1001 1101 0111 1101 0101 1001 0011 0110].

Certainly, in order to know that the target data segments obtained by parsing the sequentially received image data belong to the same target data, a manner of marking may be used for making a distinction. For example, the first four bits in the target data segments are marked segments, and are used to distinguish whether the target data segments are from the same target data, and finally, the target data segments with the same marked segments in the received target data segment are sequentially integrated to obtain the target data. As is known, in addition to setting the character at the beginning of a paragraph is to be a marked segment, the character at the end of a paragraph, or a character in other parts, or a combination of the beginning and ending characters can also be set as a marked segment.

It should be noted that the foregoing target data segment segmentation and integration manners are not limited to the manners given in the examples, and other data segmentation and integration manners that can be conceived by those skilled in the art can be used as embodiments of the present application.

When an LED is used as a light-emitting unit, a single LED uses high-frequency flicker to transmit a signal. If the LED is in a light-emitting state, the data signal "1" is transmitted, and when the LED is in a non-light-emitting state, the data signal "0" is transmitted.

In order to ensure the accuracy of the acquired image data, it is necessary to shoot more than one image in the flashing period of one LED, that is, the exposure time of the camera shutter is less than or equal to the LED strobe cycle time. If the shutter time is longer than the strobe time of the LED, it will be impossible to actually record the LED light/dark strobe, resulting in data loss and bit error. Therefore, as one embodiment of the present application, the visible light receiving unit 21 is a Charge-coupled Device (CCD) or a Complementary Metal-Oxide-Semiconductor (CMOS) sensor.

CCD or CMOS is used as the data receiving end of optical communication, and it is easier to make the visible light receiving unit 21 compatible with devices such as mobile terminals, so that the application of the smart mobile terminal is more feasible.

In order to further solve the problems of the loss of the collected data and the bit error, as an optional embodiment of the present application, the second control unit 22 is configured to:

collect image data of at least two images with an array of light and dark dots in a preset time interval;

compare image data of the at least two images acquired in the preset time interval. For example, the preset time interval described herein may correspond to a time period during which the signal transmitting device transmits a frame of visible light signals. It may be known that, in order to compare the image data, no less than two image data should be collected during the time period;

remove image data of an image in which the difference of the array of the light and dark dots is greater than a difference threshold. Optionally, the difference threshold may be that the light-dark state of the array of light and dark dots collected in image data of a certain image has more than n points, which is different from the light and dark state of the corresponding points in the array of light and dark dots of image data of other image(s). The value of n can be set according to actual needs. N is a natural number.

In this way, by removing the image data with large difference and using the remaining image data to analyze and restore the target data, the accuracy of visible light communication is further improved.

As an optional embodiment of the present application, the signal receiving device further includes a lens unit 23 which is disposed on a light incident side of the visible light receiving unit. According to the lens imaging principle, after the visible light signal being imaged by the lens unit 23, matrix dots with alternating light and dark dots (as shown in FIG. 4a or 4b) are imaged on the visible light receiving unit 21, thereby improving the clarity and accuracy of the collected image data.

A third aspect of the embodiments of the present application provides a visible light communication system.

Figure 5:
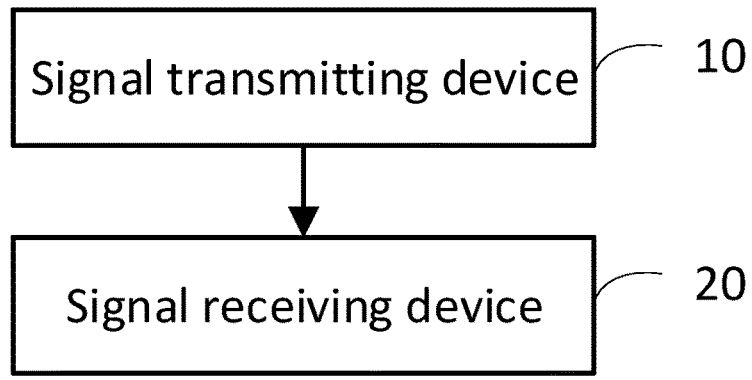
FIG. 5 is a schematic structural diagram of an embodiment of a visible light communication system provided by the present application.

As shown in FIG. 5, the visible light communication system includes a signal transmitting device 10 and a signal receiving device 20; the signal transmitting device is any of the foregoing embodiments or a combination thereof, and the signal receiving device is any of the foregoing embodiments or a combination thereof.

According to the above embodiment, it can be seen that the visible light communication system provided by the present application converts target data into a light emission control instruction according to a set encoding rule at a signal transmitting end, such that the visible light emitting unit array may transmit the target data in form of a visible light signal according to the light emission control instruction thereby to complete signal transmission based on light communication; at the signal receiving end, by collecting visible light signals, image data having an array of light and dark dots is obtained, and then the image data is parsed and restored to the target data, thereby completing signal receiving based on visible light communication; since the target data is transmitted through the visible light emitting unit array, according to the number of the light emitting units in the array, the corresponding number of visible light signals can be transmitted at the same point in time, and moreover, the target data is parsed from the collected image data, and the visible light signals of more than one light-emitting unit can be parsed from one frame of image data, so that the corresponding number of visible light signals can be received at the same point in time, and thus the transmission efficiency of the visible light communication method is greatly improved compared with the optical signal transmission of the single LED in the related art.

Figure 6A:
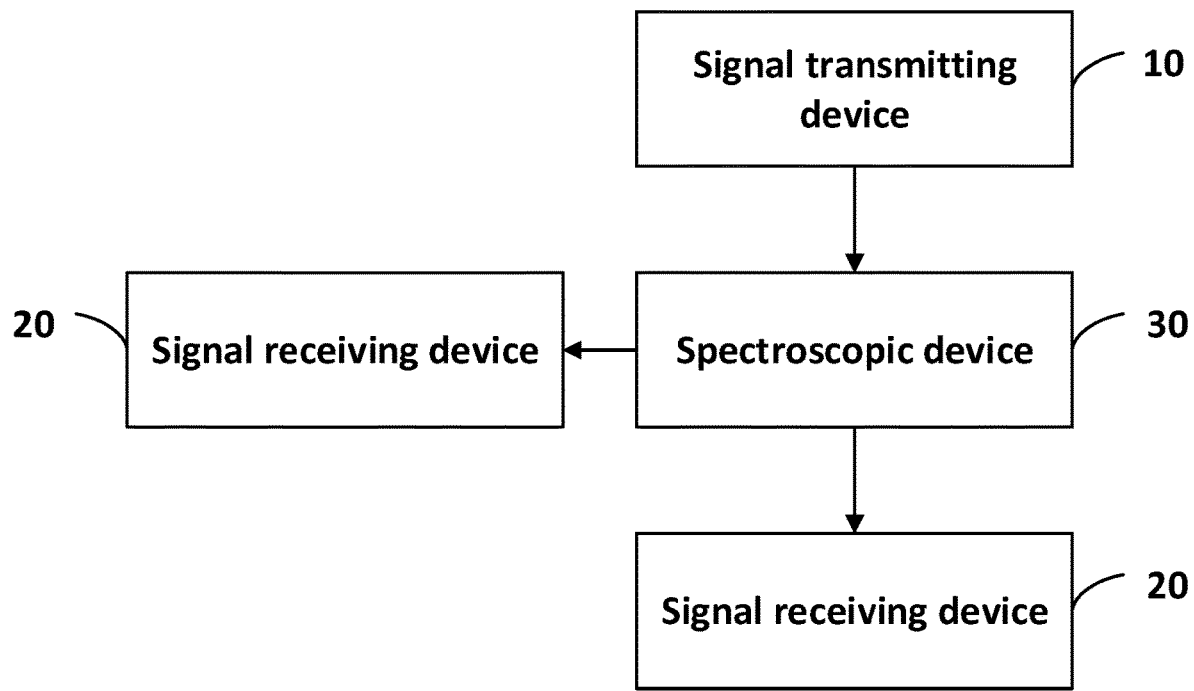
FIG. 6a is a schematic structural diagram of another embodiment of a visible light communication system provided by the present application.
Figure 6B:
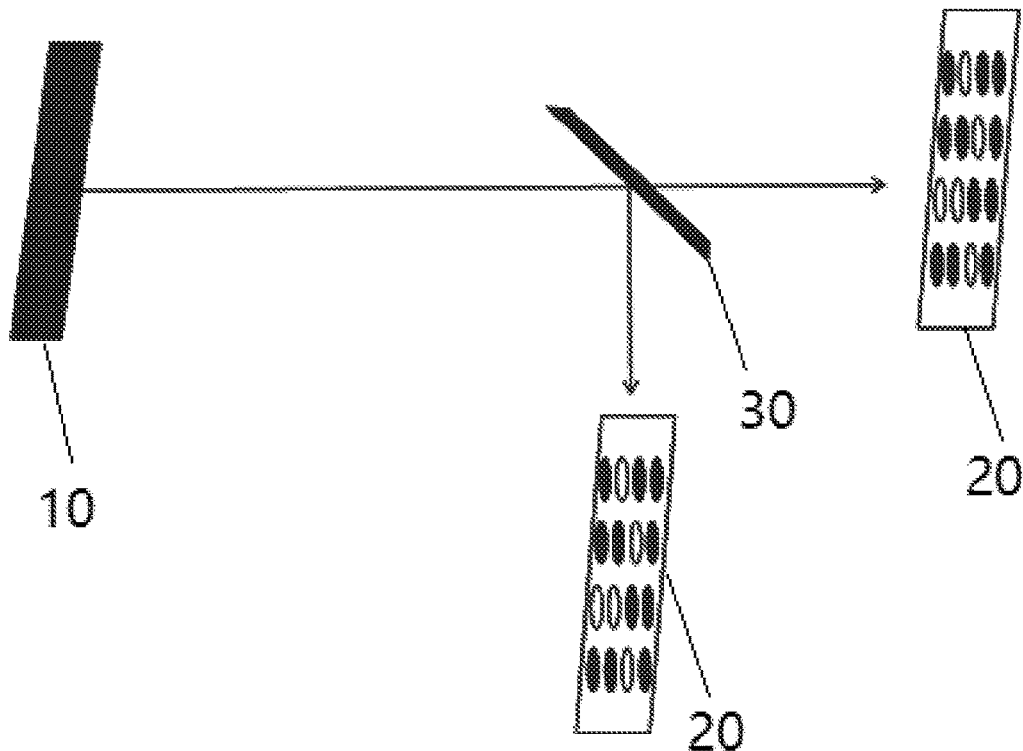
Figure 7:
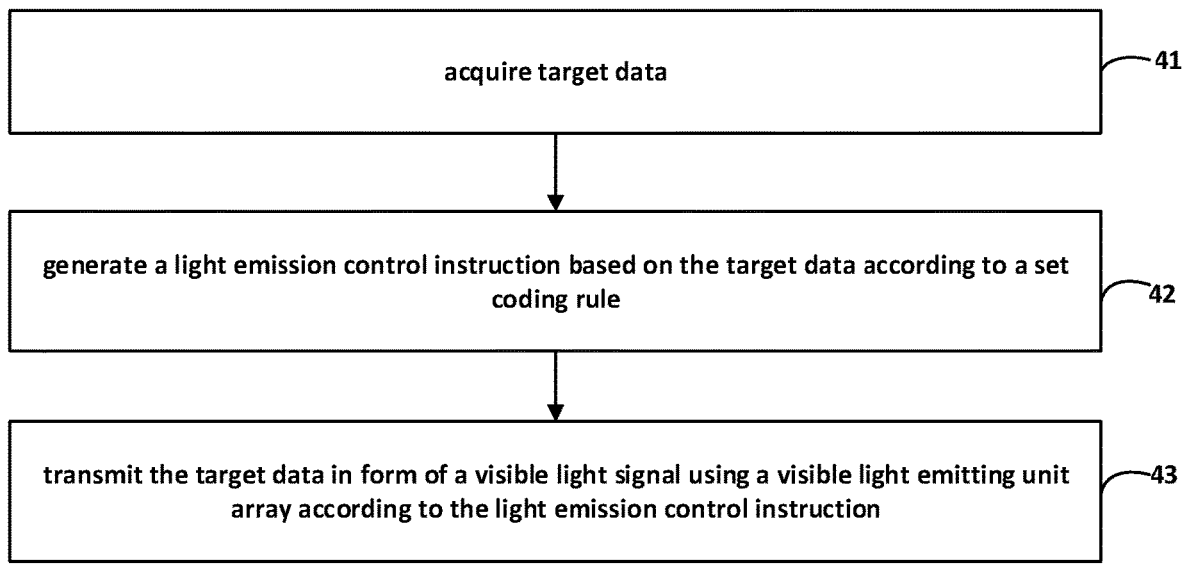
FIG. 7 is a schematic flow diagram of a visible light communication method provided by an embodiment of the present application.
Figure 8:
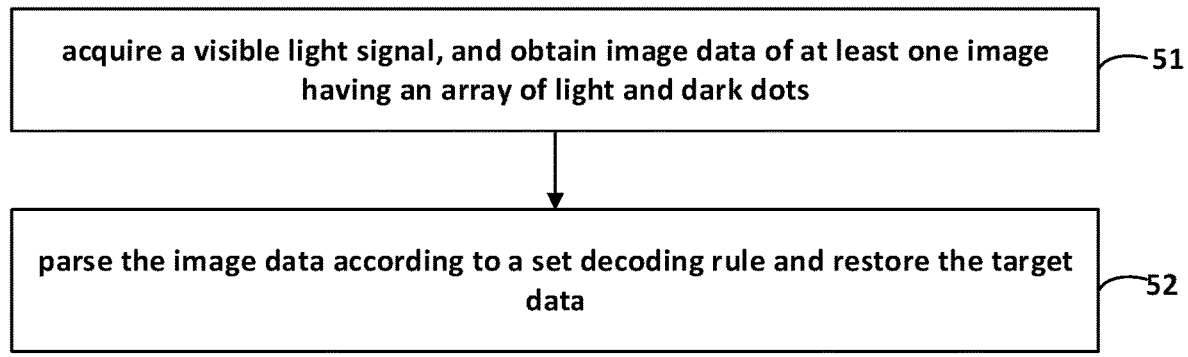
FIG. 8 is a schematic flow diagram of a visible light communication method provided by another embodiment of the present application.

As an optional embodiment of the present application, as illustrated by FIGS. 6a and 6b, the visible light communication system further includes a spectroscopic device 30, which is disposed on an optical path of the signal transmitting device 10 for transmitting a visible light signal, and the spectroscopic device 30 device is configured to divide the visible light signal into at least two paths to be received by at least two signal receiving devices 20, respectively, thereby to realize splitting of signal channels. Optionally, the light splitting device 30 can be implemented by using a transflective structure to split the light into two paths. If it is necessary to further increase the optical path, it is also possible to set a spectroscopic device again on the optical path after the light is split by the spectroscopic device 30.

Since light can only travel along a straight line, when data transmission is required through different angles, it is necessary to add a spectroscopic device to split the light into two paths, thereby receiving data through signal receiving devices located at two positions and facing different angles, such as FIG. 6b.

A fourth aspect of the embodiments of the present application provides a visible light communication method The visible light communication method comprises:

Step 41: acquiring target data;

Step 42: generating a light emission control instruction from the target data according to a set coding rule, wherein the light emission control instruction includes an instruction to control light-dark state of each light emission unit in a visible light emission unit array;

Step 43: transmitting the target data in form of a visible light signal using the visible light emitting unit array according to the light emission control instruction. That is, under the control of the light emission control instruction, each of the light emitting units in the visible light emitting unit array exhibits a light-dark state, thereby forming a transmitted visible light signal.

According to the above embodiment, it can be seen that the visible light communication method provided by the present application converts target data into a light emission control instruction according to a set encoding rule, such that the visible light emitting unit array may transmit the target data in form of a visible light signal according to the light emission control instruction thereby to complete signal transmission based on visible light communication; since the target data is transmitted through the visible light emitting unit array, according to the number of the light emitting units in the array, the corresponding number of visible light signals can be transmitted at the same point in time, so that the transmission efficiency of the visible light communication method is greatly improved compared with the optical signal transmission of the single LED in the related art.

As an optional embodiment of the present application, the visible light communication method further comprises the following steps:

determining a way of arrangement of the visible light emitting unit array;

dividing the target data into target data segments matching the way of arrangement according to said way of arrangement;

forming the corresponding light emission control instructions according to the target data segments and sequentially transmitting the light emission control instructions to the visible light emission unit array.

In this way, it is possible to continuously transmit target data with a large amount of data, thereby realizing more complicated visible light communication.

A fifth aspect of the embodiments of the present application provides a visible light communication method.

The visible light communication method comprises:

Step 51: acquiring a visible light signal to obtain image data of at least one image having an array of light and dark dots;

Step 52: parsing the image data according to a set decoding rule and restoring to the target data.

According to the above embodiment, it can be seen that the visible light communication method provided in the present application collects visible light signals to obtain image data having light and dark dots, and then parses the image data and restore the target data, thereby completing signal receiving based on visible light communication; since the target data is parsed from the collected image data, and the visible light signals of more than one light emitting unit can be parsed from one frame of image data, so that the corresponding number of visible light signals can be received at the same point in time, and thus the transmission efficiency of the visible light communication method is greatly improved compared with the optical signal transmission of the single LED in the related art.

As an optional embodiment of the present application, the visible light communication method further comprises the following steps:

comparing the image data acquired at the preset time interval;

removing image data in which the difference of the array of the light and dark dots is greater than a difference threshold.

By removing the image data with large difference and using the remaining image data to analyze and restore the target data, the accuracy of visible light communication is further improved.

As an optional embodiment of the present application, the visible light communication method further comprises the following steps:

parsing the image data to restore the target data segments;

integrating the target data segments into the target data.

In this way, the target data with a large amount of data can be transmitted and restored by being received and integrated in segments, so that the application field of the visible light communication method becomes wider.

Finally, it should be understood that those skilled in the art can understand that all or part of the processes of the method of the foregoing embodiments can be implemented by instructing the related hardware by a computer program, and the program can be stored in a computer readable storage medium. The program, when executed, may include the processes of the embodiments of the aforementioned methods. The storage medium may be a magnetic disk, an optical disk, a read-only memory (ROM), or a random access memory (RAM), etc. The technical effect of the embodiment of the computer program is the same as or similar to any of the foregoing method embodiments.

In addition, the means, device, and the like described in the present disclosure may be various electronic terminal devices, such as a mobile phone, a personal digital assistant (PDA), a tablet computer (PAD), a smart TV, etc., or may be a large terminal device, such as server, etc., so the scope of protection of the present disclosure should not be limited to a particular type of means or device. The client described in the present disclosure may be applied to any one of the above electronic terminal devices by using electronic hardware, computer software, or a combination thereof.

Furthermore, the method according to the present disclosure may also be implemented as a computer program executed by a CPU, which may be stored in a computer readable storage medium. The computer program, when executed by the CPU, performs the functions defined in the method of the present disclosure.

Furthermore, the steps of the method and the units of the system described above may also be implemented using a controller and a computer readable storage medium for storing a computer program that causes the controller to implement the steps or the functions of the units as described above.

Moreover, it should be understood that the computer readable storage medium (e.g., memory) described herein can be either a volatile memory or a nonvolatile memory, or can include both a volatile memory and a nonvolatile memory. By way of example and not limitation, the nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM), which may act as an external cache memory. By way of example and not limitation, RAM can be obtained in a variety of forms, such as synchronous RAM (DRAM), dynamic RAM (DRAM), synchronous DRAM (SDRAM), double data rate SDRAM (DDR SDRAM), enhanced SDRAM (ESDRAM), Synchronous Link DRAM (SLDRAM) and Direct Rambus RAM (DRRAM). Storage devices of the disclosed aspects are intended to comprise, without being limited to, these and other suitable types of memories.

Those skilled in the art will also understand that the various exemplary logical blocks, modules, circuits, and algorithm steps described in connection with the disclosure herein can be implemented as electronic hardware, computer software, or a combination of both. To clearly illustrate this interchangeability of hardware and software, the general description of various illustrative components, blocks, modules, circuits, and steps has been described. Whether such functionality is implemented as software or as hardware depends on the specific application and design constraints imposed on the overall system. Those skilled in the art can implement the described functions in various ways for each specific application, but such decision of implementation should not be construed as causing a departure from the scope of the disclosure.

The various exemplary logical blocks, modules, and circuits described in connection with the disclosure herein can be implemented or executed with the following components designed to perform the functions described herein: general purpose processor, digital signal processor (DSP), dedicated integrated circuit (ASIC), field programmable gate array (FPGA) or other programmable logic device, discrete gate or transistor logic, discrete hardware assembly, or any combination of these components. A general purpose processor may be a microprocessor, but in the alternative, the processor may be any conventional processor, controller, microcontroller, or state machine. The processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be included directly in hardware, in a software module executed by a processor, or in a combination of the two. A software module may reside in a RAM memory, a flash memory, a ROM memory, an EPROM memory, an EEPROM memory, a register, hard disk, a removable disk, a CD-ROM, or any other form of storage medium known in the art. An exemplary storage medium is coupled to the processor such that the processor can read information from or write information to the storage medium. In an alternative solution, the storage medium can be integrated with a processor. The processor and the storage media can reside in an ASIC. The ASIC can reside in a user terminal. In an alternative, the processor and the storage medium may reside as discrete components in the user terminal.

In one or more exemplary designs, the functions may be implemented in hardware, software, firmware, or any combination thereof. If implemented in software, the functions may be stored as one or more instructions or codes on a computer readable medium or transmitted through a computer readable medium. The computer readable media includes both a computer storage medium and a communication medium. The communication medium includes any medium that facilitates transfer of a computer program from one position to another. The storage medium can be any available medium that can be accessed by a general purpose or special purpose computer. By way of example and not limitation, the computer readable medium may comprise RAM, ROM, EEPROM, CD-ROM or other optical disk storage device, disk storage device or other magnetic storage device, or may be used for carrying or storing the necessary program codes in form of an instructions or a data structure and any other medium that can be accessed by a general purpose or special purpose computer or a general purpose or special purpose processor. In addition, any connection may be properly termed a computer readable medium. For example, if you coaxial cable, fiber optic cable, twisted pair, digital subscriber line (DSL), or wireless technology such as infrared, radio, and microwave is used to send software from a website, server, or other remote source, the coaxial cable, fiber optic cable, twisted pair, DSL or wireless technologies such as infrared, radio and microwave are included in the definition of the medium. As used herein, a magnetic disk and an optical disk include a compact disk (CD), a laser disk, an optical disk, a digital versatile disk (DVD), a floppy disk, a Blu-ray disk, in which a disk generally reproduces data magnetically, and the optical disk optically reproduces data using a laser. Combinations of the above should also be included in the scope of computer readable medium.

However, it should be noted that the disclosed exemplary embodiments can be subjected to various variations and modifications without departing from the scope of the present disclosure as defined by the claims. The functions, steps and/or actions of the method claims according to the disclosed embodiments described herein are not required to be performed in any particular order. In addition, although elements of the present disclosure may be described or claimed in a singular form, they can be considered to be plural unless explicitly limited to the singular.

It should be understood that, as used herein, unless the context clearly support exceptions, the singular form "one" ("a", "an", "the") are intended to include the plural form. It should also be understood that "and/or" as used herein is meant to include any and all possible combinations of one or more of the associated listed items.

The serial numbers of the embodiments of the present disclosure are merely for the description, and do not represent the advantages and disadvantages of the embodiments.

An ordinary person skilled in the art may appreciate that all or part of the steps of implementing the above embodiments may be completed by hardware, or may be complemented by commanding related hardware by a program, and the program may be stored in a computer readable storage medium. The storage medium mentioned above may be a read only memory, a magnetic disk or an optical disk, etc.

It should be understood by those of ordinary skill in the art that the discussion of any of the above embodiments is merely exemplary, and is not intended to suggest that the scope of the disclosure (including the claims) is limited to the examples; within the idea of the embodiments of the present application, the technical features in the examples or in the different embodiments may also be combined, and there are many other variations of the different aspects of the embodiments of the present application as described above, which are not provided in the details for the sake of simplicity. Therefore, any omissions, modifications, equivalents, improvements, etc., which are within the spirit and scope of the embodiments of the present application, should be included in the scope of protection of the embodiments of the present application.

What is claimed is:

1. A signal receiver based on visible light communication, comprising:
    a visible light receiver configured to acquire a visible light signal to obtain image data of at least one image having an array of light-dark dots;
    a second controller configured to parse the image data according to a set decoding rule and restore target data;
    wherein the second controller is further configured to:
    collect image data of at least two images having an array of light and dark dots in a preset time interval;
    compare image data of an image of the at least two images with image data of any other image of the at least two images; and
    remove, from the image data of at least two images, the image data of the image of the at least two images, in which difference of the array of light and dark dots between the image and the other image of the at least two images is greater than a difference threshold, wherein the difference threshold is a natural number of light and dark dots.

2. The signal receiver according to claim 1, wherein the second controller is further configured to:
    parse the image data to restore target data segments; and
    integrate the target data segments into the target data.

3. The signal receiver according to claim 1, wherein the visible light receiver is a charge coupled image sensor or a complementary metal oxide semiconductor image sensor.

4. The signal receiver according to claim 1, further comprising a lens unit disposed on a light incident side of the visible light receiver.

5. A visible light communication system, comprising:
    signal transmitter which comprises:
        a first controller configured to acquire target data, and generate a light emission control instruction based on the target data according to a set coding rule, wherein the light emission control instruction includes an instruction to control light-dark state of each light emitter in a visible light emitter array, and
        the visible light emitter array configured to transmit the target data in form of a visible light signal according to the light emission control instruction; and
    a signal receiver, which comprises:
        a visible light receiver configured to acquire the visible light signal to obtain image data of at least one image having an array of light-dark dots, and
        a second controller configured to parse the image data according to a set decoding rule and restore the target data;
    wherein the second controller is further configured to:
    collect image data of at least two images having an array of light and dark dots in a preset time interval;
    compare image data of an image of the at least two images with image data of any other image of the at least two images; and remove, from the image data of at least two images, the image data of the image of the at least two images, in which difference of the array of light and dark dots between the image and the other image of the at least two images is greater than a difference threshold, wherein the difference threshold is a natural number of light and dark dots.

6. The visible light communication system according to claim 5, wherein the first controller is further configured to:
divide the target data into target data segments matching a way of arrangement of the visible light emitter array according to said way of arrangement;
form corresponding light emission control instructions according to the target data segments and sequentially transmit the light emission control instructions to the visible light emitter array.

7. The visible light communication system according to claim 5, wherein the second controller is further configured to:
parse the image data to restore the target data segments;
integrate the target data segments into the target data.

8. The visible light communication system according to claim 5, wherein the visible light receiver is a charge coupled image sensor or a complementary metal oxide semiconductor image sensor.

9. The visible light communication system according to claim 5, wherein the signal receiver further comprises a lens unit disposed on a light incident side of the visible light receiver.

10. The visible light communication system according to claim 5, further comprising a spectroscopic device with a transflective structure, which is disposed on an optical path of the signal transmitter for transmitting a visible light signal and is configured to divide the visible light signal into at least two paths of visible light signals to be received by at least two signal receivers, respectively.

11. A visible light communication method, comprising:
by a signal transmitter,
acquiring target data;
generating a light emission control instruction from the target data according to a set encoding rule, wherein the light emission control instruction includes an instruction to control light-dark state of each light emitter in a visible light emitter array, and
transmitting the target data in form of a visible light signal using the visible light emitter array according to the light emission control instruction; and
by a signal receiver,
acquiring a visible light signal to obtain image data of at least one image having an array of light and dark dots, and
parsing the image data according to a set decoding rule and restoring the target data,
wherein the visible light communication method further comprises:
by the signal receiver,
collecting image data of at least two images having an array of light and dark dots in a preset time interval,
comparing image data of an image of the at least two images with image data of any other image of the at least two images, and
removing, from the image data of at least two images, the image data of the image of the at least two images, in which difference of the array of light and dark dots between the image and the other image of the at least two images is greater than a difference threshold, wherein the difference threshold is a natural number of light and dark dots.

12. The visible light communication method according to claim 11, further comprising:
by the signal transmitter,
dividing the target data into target data segments matching a way of arrangement of the visible light emitter array according to said way of arrangement,
forming corresponding light emission control instructions according to the target data segments and sequentially transmitting the light emission control instructions to the visible light emitter array.

13. The visible light communication method according to claim 12, further comprising:
by the signal receiver,
parsing the image data to restore the target data segments, and
integrating the target data segments into the target data.

14. The visible light communication method according to claim 11, further comprising:
dividing, by a spectroscopic device with a transflective structure, the visible light signal into at least two paths of visible light signals, and
receiving the at least two paths of visible light signals by at least two signal receivers, respectively.

* * * * *